Jan. 17, 1956 D. C. REDICK 2,731,525
DIRECTION SIGNALING DEVICE
Filed Oct. 17, 1951 2 Sheets-Sheet 1

Inventor
David C. Redick
By
Willits, Helmig & Baillio
Attorneys

Jan. 17, 1956  D. C. REDICK  2,731,525
DIRECTION SIGNALING DEVICE
Filed Oct. 17, 1951  2 Sheets-Sheet 2

Inventor
David C. Redick
By Willits, Helwig & Baillio
Attorneys

United States Patent Office 2,731,525
Patented Jan. 17, 1956

2,731,525

DIRECTION SIGNALING DEVICE

David C. Redick, Anderson, Ind., assignor to General Motors Corporation, Detroit, Mich., a corporation of Delaware Application October 17, 1951, Serial No. 251,785

8 Claims. (Cl. 200—61.34)

The present invention relates to direction signal control mechanisms for motor vehicles and the like.

One object of the present invention is to provide a novel and highly improved direction switch mechanism which is manually adjustable from a neutral position to different signal indicating positions and which is automatically adjustable from said signal indicating positions to neutral position.

Another object is to provide in a signal switch mechanism of the stated character, automatically operable signal cancelling means which is so constructed and arranged that it may be rendered inoperative by retention of manual switch adjusting means in switch operated position thus preventing damage to the moving parts by improper operation of the said switch mechanism.

A further object is to provide a signal switch mechanism which is compact in structure and smooth and silent in operation.

A still further object is to provide a signal switch mechanism which is simple in construction and comprised of parts which are adapted for rapid assembly and thereby extremely economical in manufacture.

Further objects and advantages of the invention will be apparent from the following description.

Figure 1:
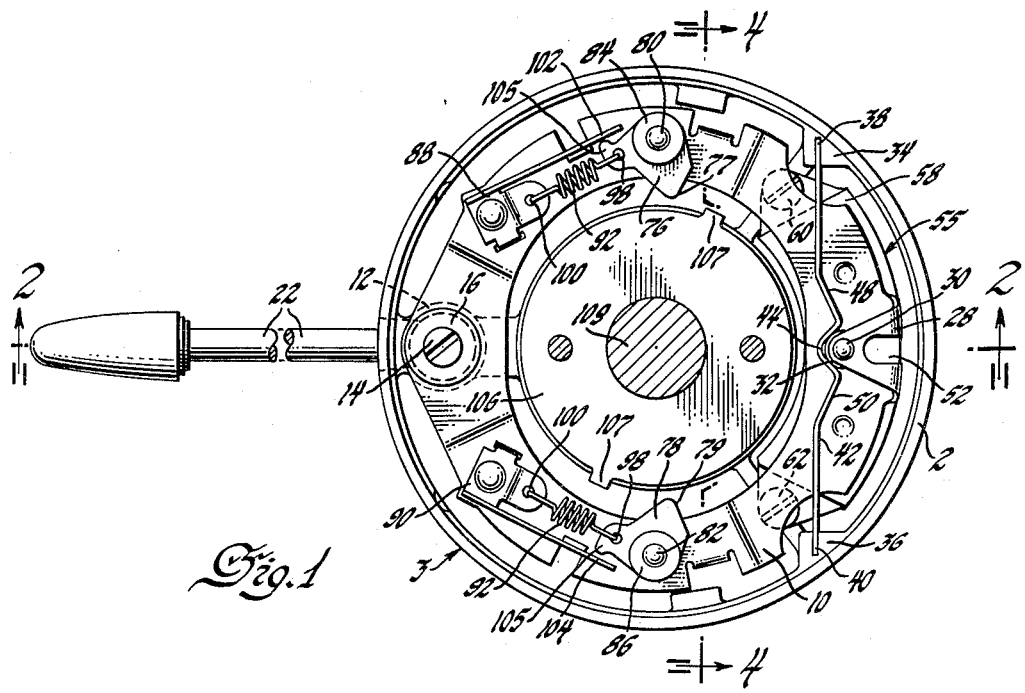
Figure 2:
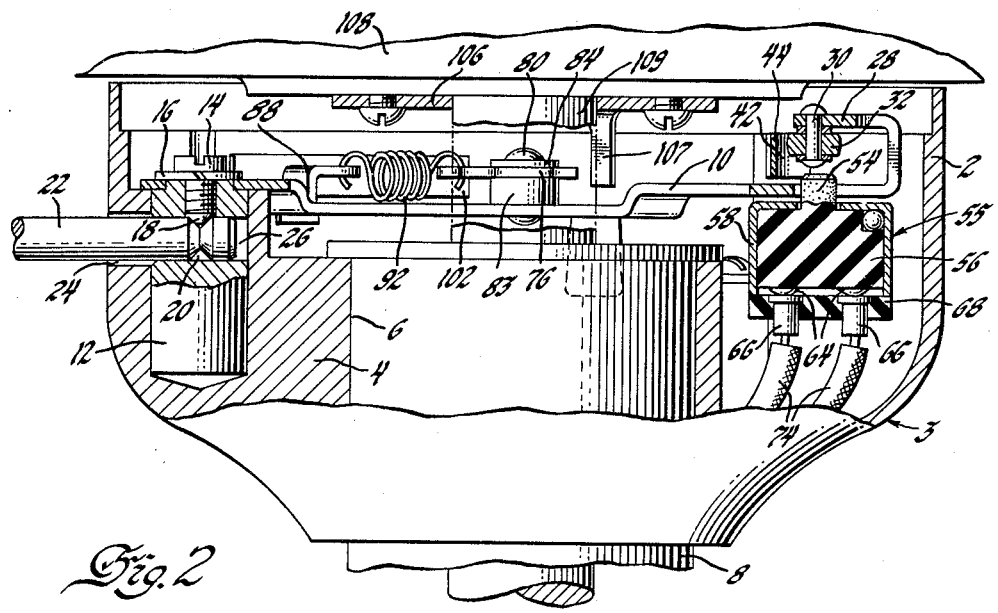
Figure 3:
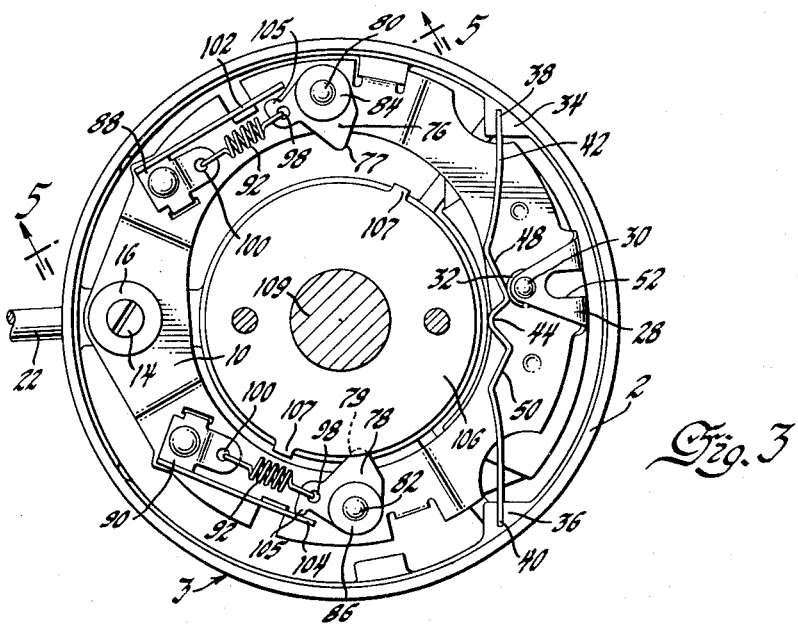
Figure 4:
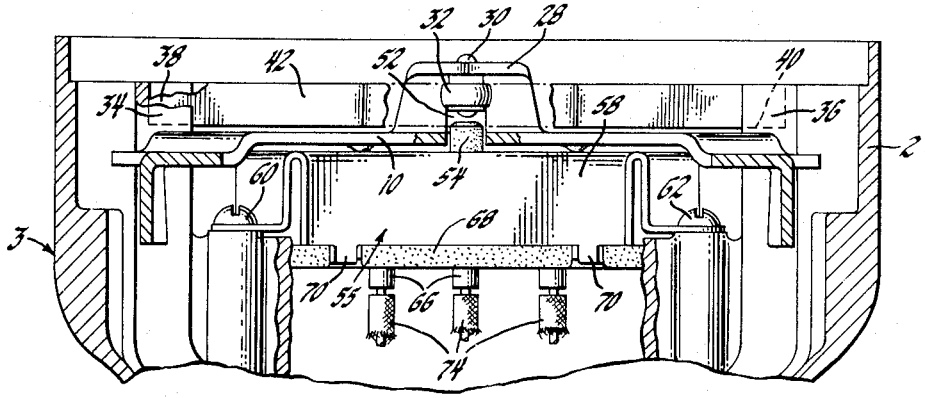
Figure 5:
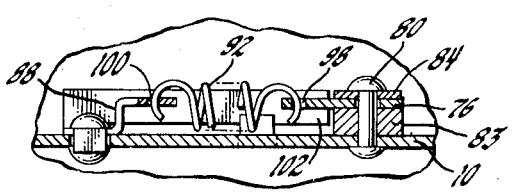

Of the drawings:

Fig. 1 is a plan view, partly in section, of the signal switch mechanism showing the position of the parts thereof when the mechanism is in neutral position. Fig. 2 is an enlarged sectional elevational view taken substantially along line 2—2 of Fig. 1. Fig. 3 is a plan view, partly in section, similar to Fig. 1 showing the position of the parts when the switch mechanism is in one of its signal indicating positions. Fig. 4 is an enlarged sectional elevational view taken substantially along line 4—4 of Fig. 1, showing the arrangement of certain elements of the switch mechanism including the electrical switch and the operating ring. Fig. 5 is an enlarged fragmentary sectional view taken substantially along line 5—5 of Fig. 3.

Referring now to the drawings and particularly Figs. 1 and 2 there is illustrated a housing 2 provided near the upper end of a vehicle steering mechanism indicated generally at 3. Housing 2 has provided therein a web 4 having a central opening 6 through which the upper end of the steering column 8 extends.

Concentrically disposed within the housing 2 is a substantially flat switch operating ring 10 secured at one end thereof to the upper end of a stud 12. Ring 10 is retained on stud 12 by a machine screw 14 making threaded engagement with a vertical bore in said stud and a washer 16. The tapered end 18 of screw 14 extends into an annular groove 20 provided in an operating lever 22 for ring 10. Lever 22 extends through an aperture 24 in the housing 2 and into a transverse bore 26 provided in stud 12. The stud 12 is journaled in the web 4 at one side of the housing 2 and provides a pivotal support for ring 10 within the housing.

Substantially diametrically opposite the pivotal mounting 12, ring 10 is formed with an upwardly offset inturned portion 28 having a rivet 30 attached thereto for rotatably supporting a roller 32. A pair of spaced slotted bosses 34 and 36 disposed substantially equidistant from roller 32 when ring 10 is in its neutral position are formed on the housing 2 to retain the ends 38 and 40 of a blade detent spring 42. Spring 42 extends across the housing 2 on a line substantially tangent to said roller 32 and has an undulating midportion defining a notch 44 which yieldably engages the roller 32 to hold the ring 10 in the neutral position. On each side of the notch 44 are ramp portions 48 and 50 which yieldably urge the ring 10 toward either of its signal indicating positions when the roller is moved out of the notch 44. It will be seen that the action of the roller 32 against the undulating midportion of the spring 42 provides a highly effective means for yieldably retaining the ring 10 in three defined positions, namely right, neutral and left.

Directly beneath the roller 32 ring 10 is provided with an open slot 52 adapted to engage the operating arm or stud 54 of the movable electric switch 55. Switch 55 is attached to the web of the housing 2 by any suitable means, as by machine screws 60 and 62. Switch 55 is of the type commonly used in direction signal systems and is so constructed as to control the energization and de-energization of such systems. Switch 55 generally comprises the movable contact or bridging member 56 slidably mounted in the casing 58 of said switch and carries bridging contacts 64 adapted to engage fixed contact elements 66 mounted in a terminal plate 68 which in turn is attached to the casing 58 by clinch tabs 70 in such a manner as to extend across the bottom thereof. The fixed contacts 66 are connected to lead wires 74 and arranged to provide circuit connections correlated with the adjusted positions of the ring 10. Such circuits are well known in the art and will not be described in further detail herein, as they form no part of the invention.

A pair of dogs or pawls 76 and 78 are mounted at substantially opposite points on ring 10 as shown more particularly in Fig. 1. Pawls 76 and 78 are pivotally mounted on ring 10 by pins or rivets 80 and 82, and washers 84 and 86. Spacers hold the said pawls in spaced relation with the upper surface of said ring. The pawls are formed with lobe portions 77 and 79 which normally extend inwardly a short distance beyond the inner periphery of ring 10 for a purpose which will presently be described.

A pair of spring retaining brackets 88 and 90 are secured by riveting or welding to the upper surface of the ring 10 a short distance from pawls 76 and 78 respectively. A coil spring 92 having a hook at each end extends between each pawl 76 and 78 and its bracket 88 or 90, the said hooks extend through apertures 98 and 100 formed in said pawl and bracket respectively. Pawls 76 and 78 thus are yieldably held in position in such a manner that the lobes 77 and 79 project interiorly of the ring 10, as shown in Fig. 1. Formed integrally with the brackets 88 and 90 are upturned elongated blade spring or cantilever leaf members 102 and 104. The free ends of spring members 102 and 104 lie adjacent pawls 76 and 78 and provide resilient abutments or stops for said pawls when swung in one direction. As shown in Fig. 1, an outwardly extending lobe 105 is provided on each pawl 76 and 78 which engages springs 102 and 104 when the associated pawl is swung outwardly as will appear later herein. Springs 102 and 104 are so constructed as to resist rotation of pawls 76 and 78. However should manual restraint or a foreign particle prevent normal movement of the ring 10, the said springs will be deflected outwardly by the camming action of the lobes 105 on said pawls.

To provide for automatic cancelling of a manually set signal, there is provided a circular plate 106 attached to the base of the steering wheel 108, which in turn is attached to the end of steering shaft 109. Disposed at substantially diametrically opposite points thereon, plate 106 has secured thereto a pair depending ears or dogs 107 which function as switch cancelling means which engage pawls 76 and 78 to return the ring 10 to neutral position after adjustment thereof to one of its signal designating positions. When the operating ring 10 is in the neutral position as in Fig. 1, the pawls 76 and 78 lie outside the path of movement of ears 107. When the ring 10 is manually set in one of its operating positions, as for instance to the left turn signaling position illustrated in Fig. 3, the ring 10 is shifted arcuately, placing the lobe portion 79 of pawl 78 in the circular orbit of the depending ears 107. As the wheel 108 is rotated in the direction of the signaled turn the depending ears rotate the pawl 78 clockwise against the light spring 92, successively clearing their circular path by rotational displacement of the pawl. Upon reversal of rotation, the pawl 78 is prevented from rotating by the resistance of resilient abutment 104 causing the pressure of the depending ears 107 on the pawl 78 to be transmitted to the ring 10, camming it to neutral. However, should the operator manually hold the ring in the left turn signal position against the cancelling action of return rotation of the wheel, the resistance offered by the blade spring detent 44 augmented by the pressure of manual holding will be greater than the resistant of the resilient abutment 104 which will then deflect outwardly as the pawl 78 rotates counterclockwise out of the path of the depending ears 107. It will be seen that the resilient abutment 104 need be of only slightly greater resistance than the detent spring 42 in order to function as a fixed abutment under normal conditions, while providing a highly efficient means for overriding the automatic cancelling action when the resistance of the detent 44 is manually augmented, as by holding the handle 22. When the signal mechanism is set in the right turn signaling position the ring 10 is swung about stud 12 in such a manner as to bring the lobe 77 of pawl 76 into the path of movement of ears 107. Consequently, when the steering wheel rotates in the direction of the turn indicated by this setting of ring 10, the ears 107 engage lobe 77 causing pawl 76 to rotate in a counterclockwise direction until it clears the end thereof without causing any change in the setting of said ring. After each ear 107 clears pawl 76 its spring 92 immediately restores it to the position shown in Fig. 1. When the steering wheel is rotated in the reverse direction after making the turn, the opposite side of lobe 77 will be engaged by an ear 107. The movement of pawl 76 in a clockwise direction will now be resisted by spring 92 and consequently ring 10 will be restored to neutral position. Should the operator restrain movement of lever 22 and ring 10 against movement to neutral position, spring 92 will flex under the action of ear 107 against pawl 76 until the ear clears the end of said pawl. Damage to the parts under these conditions is thus prevented.

From the foregoing description it is seen that a simplified device has been devised wherein a one piece diecast housing and a relatively small number of operating parts are required in the construction thereof. Most of the parts are so designed as to be especially suited to press forming from sheet metal, thereby rendering the manufacture of my improved device both rapid and inexpensive.

While but a single embodiment has been shown and described, it is to be understood that other modifications may be adopted without departing from the scope of the invention. It is to be understood therefore that it is not intended to limit the invention to the single embodiment shown but only by the scope of the claims which follow.

What I claim and desire to secure by Letters Patent of the United States is:

1. In a device of the class described, the combination of a switch movable from an open neutral position to circuit closing positions at opposite sides of said neutral position, a fixed support for said switch, an operating member for said switch mounted on said support, oppositely disposed pawls pivotally mounted on said operating member, flexible means on said operating member adapted to engage said pawls, said flexible means comprising a pair of spring members, one for each of said pawls, means for mounting said spring members between said operating member and said pawls, rotatable means having operating lugs thereon, and means for yieldingly retaining said pawls in such position as to cause engagement of one of said pawls by said lugs when said operating member is adjusted to one of its switch closing positions and to cause engagement of the other of said pawls by said lugs when said operating member is adjusted to the other of its switch closing positions, said spring members being adapted to yieldingly resist rotation of said pawls in one direction when no external force is applied to hold said operating member against movement and to yieldingly allow rotation of said pawls in said one direction when external force is applied to hold said operating member against movement.

2. In a device of the class described, the combination of a switch movable from an open neutral position to circuit closing positions at opposite sides of said neutral position, a fixed support for said switch, an operating member for said switch mounted on said support, oppositely disposed pawls pivotally mounted on said operating member, flexible means on said operating member adapted to engage said pawls, said flexible means comprising a pair of cantilever leaf springs, one for each of said pawls, means for attaching said springs to said operating member adjacent their associated pawls, rotatable means having operating lugs thereon, and means for yieldingly retaining said pawls in such position as to cause engagement of one of said pawls by said lugs when said operating member is adjusted to one of its switch closing positions and to cause engagement of the other of said pawls by said lugs when said operating member is adjusted to the other of its switch closing positions, said leaf springs being adapted to normally resist rotation of said pawls in one direction and yieldingly allow rotation of said pawls when abnormal resistance is encountered by said operating member.

3. In a device of the class described, the combination of a switch moveable from an open neutral position to circuit closing positions at opposite sides of said neutral position, a fixed housing, a ring shaped operating member for said switch, said operating member being substantially concentric with said housing, means for pivotally mounting said ring at one side of said housing, a steering shaft, switch cancelling means on said steering shaft, said cancelling means comprising a plate having depending ears adapted to describe a circular path within the space defined by the inner periphery of said operating ring, a pair of pawls pivotally mounted at opposite sides of said operating ring, an inwardly extending lobe on each of said pawls, one of said lobes being adapted to intersect the rotational path of said depending ears when said ring is in one of its switch closing positions, the other of said lobes being adapted to intersect said rotational path of said ears when said ring is in its other switch closing position, resilient means for positioning said pawls on said ring and, a pair of resilient stops attached to said ring, on for each of said pawls, whereby said pawls may be freely rotated by the circular movement of said depending ears in one direction, said stops resisting rotation of said pawls in the opposite direction.

4. In a device of the class described, the combination of a switch moveable from an open neutral position to circuit closing positions at opposite sides of said neutral position, a fixed support, a substantially ring shaped operating member for said switch, means for pivotally mounting said ring at one side of said support, a pair of pawls pivotally mounted at opposite sides of said operating member, said pawls having lobes projecting interiorly of said ring, rotatable switch cancelling means, said cancelling means comprising a plate having depending ears adapted to describe a circular path within the spaced defined by the inner periphery of said operating ring, resilient stop means attached to said ring for yieldably resisting rotation of said pawls in one direction, spring means attached to said pawls for yieldably locating said pawls, and detent means for yieldably retaining said ring in a plurality of adjusted positions.

5. In combination, a switch adapted for movement from a neutral position to circuit closing positions at opposite sides of said neutral position, a steering column, a support mounted on said steering column, an annular operating ring for said switch pivotally mounted on said support, a pair of pawls pivotally attached to said annular ring at opposite sides thereof, cancelling means mounted for rotary movement and adapted to engage either of said pawls to return said annular ring to neutral position after operation thereof to a switch closing position, and a pair of stop members on said annular ring, one for each of said pawls, each of said stop members comprising a resilient blade anchored at one end thereof on said annular ring, the other end being disposed adjacent its associated pawl to resiliently limit rotation of the latter in one direction, means for resiliently positioning said pawls on said ring, and resilient means for retaining said annular ring in any of its adjusted positions.

6. The invention as set forth in claim 4 wherein said resilient stop means attached to said ring comprises a pair of spring members one for each of said pawls, means for mounting said spring members between said operating member and said pawls, said spring member being adapted to yieldingly resist rotation of said pawls in one direction when no external force is applied to hold said operating member against movement and to yieldingly allow rotation of said pawls in said one direction when external force is applied to hold said operating member against movement.

7. The invention as set forth in claim 4 wherein said resilient stop means attached to said ring comprises a pair of cantilever leaf springs, one for each of said pawls, means for attaching said spring to said operating member adjacent their associated pawls, said leaf springs being adapted to normally resist rotation of said pawls in one direction and to yieldingly allow rotation of said pawls when abnormal resistance is encountered by said operating ring.

8. In combination, a switch adapted for movement from a neutral position to circuit closing positions at opposite sides of said neutral position, a steering column, a support mounted on said steering column, an annular operating ring for said switch pivotally mounted on said support, resilient means for retaining said ring in any of its adjusted positions, a steering wheel disposed near one end of said steering column adjacent said support, a pair of pawls pivotally attached to said annular ring at opposite sides thereover, means resiliently positioning said pawls, cancelling means mounted for movement with said steering wheel and adapted to engage either of said pawls to move said annular ring to neutral position after operation thereover to a switch closing position, and a pair of stop members on said annular ring, one for each of said pawls, each of said stop members comprising a resilient blade secured at one end thereof on said annular ring, the other end being disposed adjacent its associated pawl to resiliently resist rotation of the latter in one direction, the resistance of said resilient blades being greater than the resistance of said resilient means for retaining said ring in said adjusted positions.

References Cited in the file of this patent

UNITED STATES PATENTS

| | | |
|---|---|---|
| 2,249,137 | Hill | July 15, 1941 |
| 2,276,413 | Moore | Mar. 17, 1942 |
| 2,347,342 | Thirlwell | Apr. 25, 1944 |
| 2,525,033 | Hollins | Oct. 10, 1950 |
| 2,611,842 | Lybrook | Sept. 23, 1952 |
| 2,643,308 | Lincoln et al. | June 23, 1953 |
| 2,691,704 | Lincoln et al. | Oct. 12, 1954 |
| 2,693,511 | Daon | Nov. 2, 1954 |